United States Patent [19]

Comerci et al.

[11] Patent Number: 5,527,990
[45] Date of Patent: Jun. 18, 1996

[54] MOUNTING APPARATUS FOR AN ELECTRICAL POWER DISTRIBUTION DEVICE

[75] Inventors: Joseph D. Comerci, Elmhurst; Robert DeRoss, Naperville, both of Ill.

[73] Assignee: Molex Incorporated, Lisle, Ill.

[21] Appl. No.: 333,927

[22] Filed: Nov. 3, 1994

Related U.S. Application Data

[63] Continuation of Ser. No. 828,530, Jan. 24, 1992, abandoned.

[51] Int. Cl.⁶ ..................................................... H02G 3/18
[52] U.S. Cl. .................. 174/48; 174/58; 174/64
[58] Field of Search .................... 174/48, 58, 61–64, 174/65 R; 220/3.2, 3.3, 3.9

[56] References Cited

U.S. PATENT DOCUMENTS

| | | | |
|---|---|---|---|
| 2,099,117 | 11/1937 | Kelsay . | |
| 2,214,968 | 9/1940 | MacMillen . | |
| 2,436,431 | 2/1948 | Hasselhorn | 174/58 X |
| 3,226,469 | 12/1965 | Majors | 174/58 X |
| 3,662,085 | 5/1972 | Robinson et al. | 174/58 X |
| 3,780,209 | 12/1973 | Schuplin | 174/51 |
| 3,868,080 | 2/1975 | Olson | 174/58 X |
| 4,667,840 | 5/1987 | Lindsey | 174/48 X |

FOREIGN PATENT DOCUMENTS

| | | | |
|---|---|---|---|
| 501728 | 2/1939 | United Kingdom | 174/64 |

*Primary Examiner*—Peter Vo
*Attorney, Agent, or Firm*—Stephen Z. Weiss

[57] ABSTRACT

A mounting apparatus is disclosed for mounting an electrical power distribution device to a wall support member inside a wall panel to protect an electrical cable running into the apparatus. The mounting apparatus includes a bracket portion for mounting the power distribution device, the bracket portion being securable to the wall support member to project therefrom. A shield portion of the apparatus extends beyond the bracket portion in the running direction of the cable to protect the cable beyond the power distribution device outside the bounds of the bracket portion.

7 Claims, 3 Drawing Sheets

MOUNTING APPARATUS FOR AN ELECTRICAL POWER DISTRIBUTION DEVICE

This is a continuation of application Ser. No. 08/828,530, filed Jan. 24, 1992.

FIELD OF THE INVENTION

This invention generally relates to the art of electrical distribution systems and, particularly, to a mounting apparatus for mounting an electrical connector or power distribution device to a wall support member or the like.

BACKGROUND OF THE INVENTION

Various mounting apparatus, such as mounting brackets, have been provided for mounting electrical connectors or electrical power distribution devices to various support structures whereby electrical cables can be fed into or through the mounting apparatus for termination purposes therewithin. For instance, various mounting brackets of the prior art include enclosed box-like structures into which electrical cables are fed through punched-out holes in the boxes. The boxes provide an enclosed area within which the cables can be terminated or interconnected with other cables or electrical lines, with the boxes protecting the cable terminations.

One application for such mounting apparatus is in wall constructions wherein wall panels are supported by interior wall support members, such as drywall panels being supported by interior studs. The mounting apparatus usually are secured to the interior studs, behind the wall panels, and the mounting apparatus, usually fabricated of metal material, protect the electrical terminations. For instance, extraneous objects such as nails, screws and the like may be inserted through a wall panel and, without the protective mounting apparatus, the objects can damage or destroy the electrical terminations. If the nail or screw contacts a power line, the person driving the nail or turning the screw could be injured by electrical shock. An example of the box-type mounting bracket structure is shown in U.S. Pat. No. 2,214,968 to MacMillen, dated Sep. 17, 1940.

There are certain applications wherein mounting bracket structures of the character described above are not fully advantageous. An example is in an application wherein generally flat or ribbon-type electrical cable is employed and which normally is protected, in cable form, by an exterior protective sheath or tubing. More specifically, some flat electrical cable is rolled into a generally cylindrical configuration and covered by a tubular insulating cladding or sheath. When the cable is to be terminated, the protective sheath is cut or stripped back, and the ribbon cable is unrolled into its operative flat configuration. An end of the cable may be terminated to an electrical connector or other power distribution device, or a tap connector may be terminated intermediate the ends of the cable. In either instance, the outer tubular sheath of the cable must be removed a distance away from the point of termination. This will leave a substantial portion of the flat cable unprotected outside the bounds of presently known mounting brackets. This invention is directed to solving these problems by providing a mounting apparatus which protects electrical cable, such as a flat ribbon-type cable, beyond a specific point of termination of the cable in an appropriate mounting bracket.

SUMMARY OF THE INVENTION

An object, therefore, of the invention is to provide a new and improved mounting apparatus for mounting an electrical power distribution device to a wall support member behind a wall panel to protect an electrical cable running into or through the apparatus.

In the exemplary embodiment of the invention, the mounting apparatus includes a bracket portion for mounting the power distribution device 19, along with means for securing the apparatus to the wall support member with the bracket portion projecting therefrom. The invention contemplates that a shield portion of the apparatus extend beyond the bracket portion in the running direction of the cable to protect the cable beyond the power distribution device 19 outside the bounds of the bracket portion.

More specifically, the mounting apparatus is fabricated as a unitary structure stamped and formed of sheet metal material. The shield portion is formed as a plate-like portion extending generally parallel to the cable and has a substantial width sufficient to protect an exposed portion of a cable. The plate-like portion is spaced from the bracket portion to define an open area therebetween and through which the cable can run. The plate-like portion includes wings extending beyond opposite ends of the bracket portion in the running direction of the cable. The wings are bent toward the bracket portion to position the cable spaced from the wall panel.

A feature of the invention includes the provision of at least one cable tie finger stamped from the apparatus and which is capable of being bent around the cable to facilitate preliminary positioning of the cable relative to the bracket and shield portions.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings in which like reference numerals identify like elements in the figures and in which:

DETAILED DESCRIPTION OF THE PREFERRED EMBODIMENT

Figure 1:
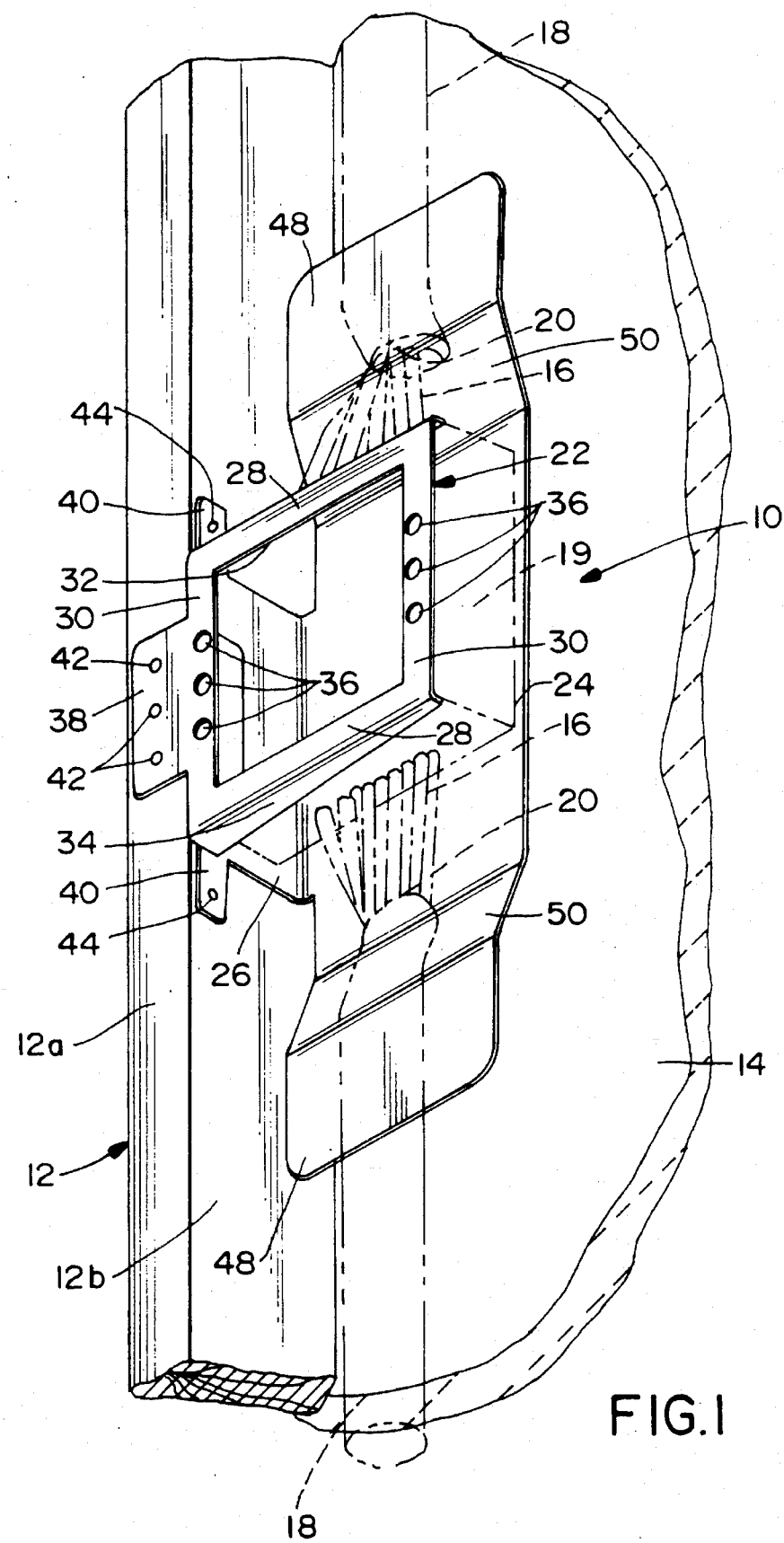
FIG. 1 is a perspective view of a mounting apparatus incorporating the concepts of the invention.
Figure 4:
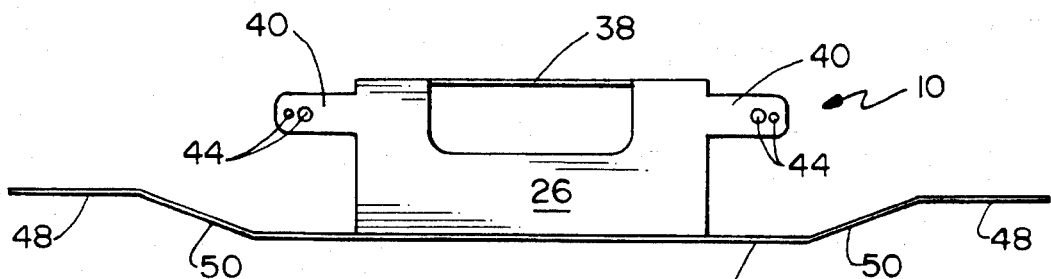
FIG. 4 is a side elevational view, looking toward the rear of FIG. 2.
Figure 2:
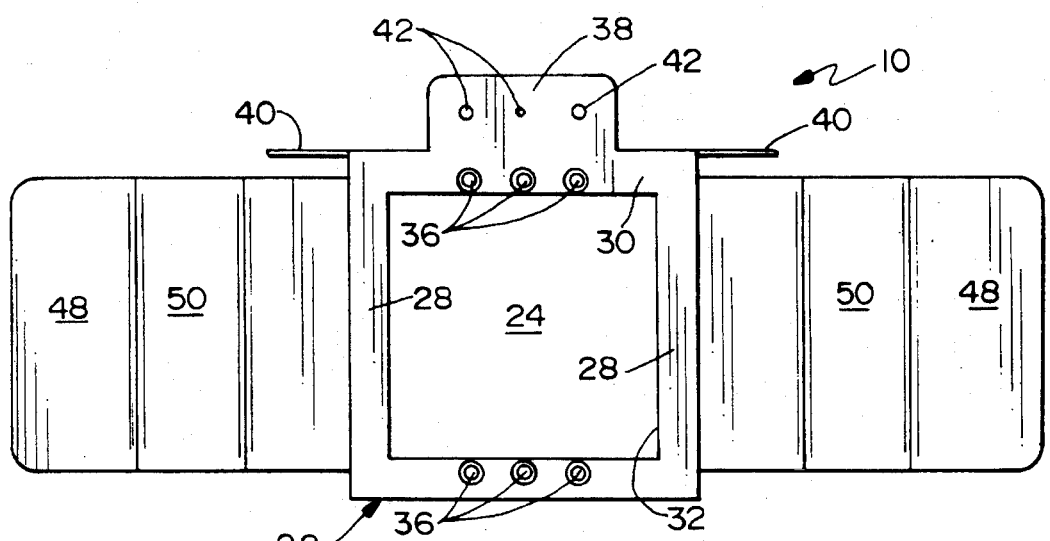
FIG. 2 is a plan view of the mounting apparatus shown in FIG. 1.
Figure 3:
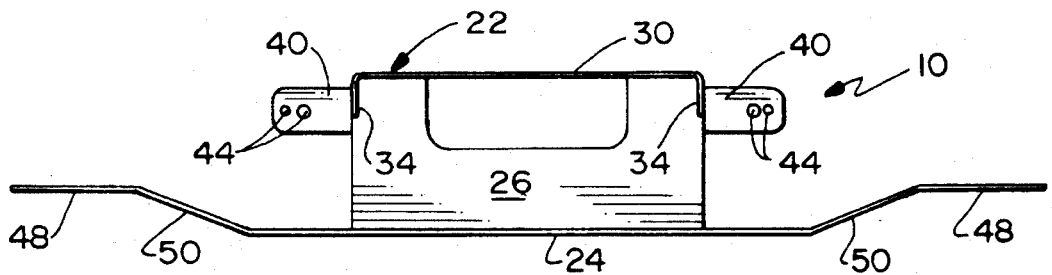
FIG. 3 is a side elevational view, looking toward the front of FIG. 2.

Referring to the drawings in greater detail, and first to FIGS. 1–4, the invention is incorporated in a mounting apparatus, generally designated 10, for mounting an electrical connector or other electrical power distribution device (not shown) to a wall support member, generally designated 12, inside a rear wall panel 14, to protect an electrical cable 16 running through the apparatus.

Before describing mounting apparatus 10 in greater detail, it should be noted that the apparatus is particularly applicable for use with a flat ribbon-type cable 16, as shown in FIG. 1. Such a flat cable often is rolled into a cylindrical form and is covered by a generally tubular protective outer covering or insulating sheath 18. The outer covering is removed or cut-back, as at 20, to expose the flat cable 16 which runs through the apparatus for termination to the electrical power distribution device 19. Mounting apparatus 10 is designed for protecting the exposed flat cable 16 which has been rendered unprotected by the removal of outer covering 16. However, it should be understood that the invention is equally applicable for other cable configurations with which the apparatus is advantageously usable.

Generally, mounting apparatus 10 includes a bracket portion, generally designated 22, and a shield portion 24 extending beyond opposite ends of the bracket portion to fully protect exposed cable 16. The apparatus is fabricated as a unitary structure stamped and formed from sheet metal material and includes a wall portion 26 which spaces bracket portion 22 from shield portion 24 to define an open area therebetween and through which cable 16 can pass, as seen in FIG. 1.

More particularly, bracket portion 22 is generally rectangular in configuration and includes a pair of end walls 28 and a pair of side walls 30, with the end walls and side walls being generally coplanar and defining a rectangularly shaped opening 32 for receiving an electrical power distribution device or connector (not shown). End walls 28 have rigidifying flanges 34, and side walls 30 have apertures 36 through which appropriate fastening means can be inserted for mounting the power distribution device 19 to bracket portion 22. The bracket portion is secured to a front edge 12a of wall support member 12 by means of a flange 38 and to a side 12b of the wall support member by a pair of ears 40. Flange 38 is generally coplanar with end walls 28 and side walls 30 and includes apertures 42 through which appropriate fastening means can be inserted to mount the apparatus to front edge 12a of the wall support member. Ears 40 are generally coplanar with wall portion 26 and include apertures 44 through which appropriate fastening means can be inserted to secure the apparatus to side 12b of the wall support member.

With the above-described structural combination, end walls 28 and side walls 30 of bracket portion 22 will lie generally flush with edge 12a of wall support member 12 immediately behind a second or front wall panel (not shown) secured to front edge 12a of the wall support member, whereas wall panel 14 will be secured to the opposite or rear edge of the wall support member. As an example, wall support member 12 may be a stud extending between a pair of generally parallel drywall panels.

It can be understood from the above description that such extraneous objects as nails, screws and the like may be inserted through wall panel 14 in the area of unprotected cable 16 and which might damage, short or destroy the cable, because the precise location of mounting apparatus 10 is not visible from the outside of rear wall panel 14. This problem is not as prevalent with the insertion of objects through the wall panel which is secured to front edge 12a of wall support member 12, because opening 32 in bracket portion 22 normally defines the receptacle area for a plug-in type electrical connector.

In order to protect cable 16 from foreign objects inserted through wall panel 14, as described above, shield portion 24 of mounting apparatus 10 extends beyond bracket portion 22 in the running direction of the cable to protect the cable outside the bounds of the bracket portion. The shield portion may project beyond one end of the bracket portion but, preferably, the shield portion projects beyond both ends of the bracket portion in the running direction of the cable to provide full protection in those instances wherein the cable runs completely through the mounting apparatus, as shown in FIG. 1, as when the cable is terminated to a tap electrical power distribution device 19 or connector.

Figure 5:
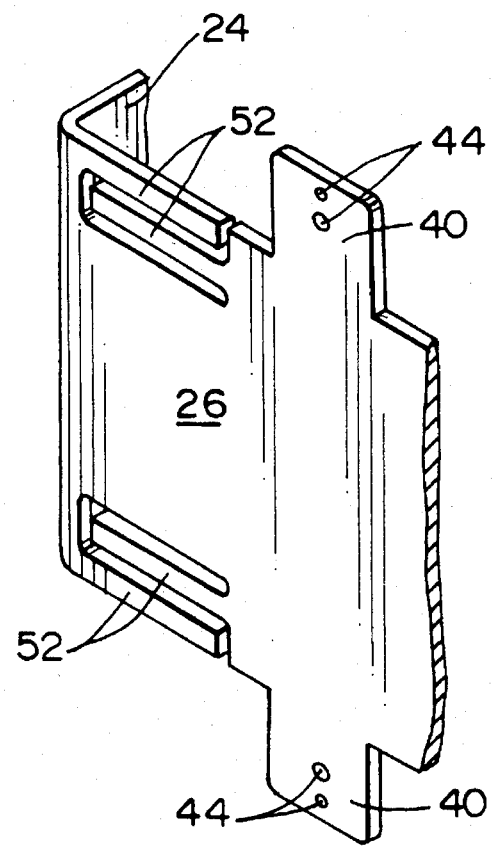
FIG. 5 is a fragmented perspective view of a portion of an alternate embodiment of the mounting apparatus, including the feature of pairs of cable ties.
Figure 6:
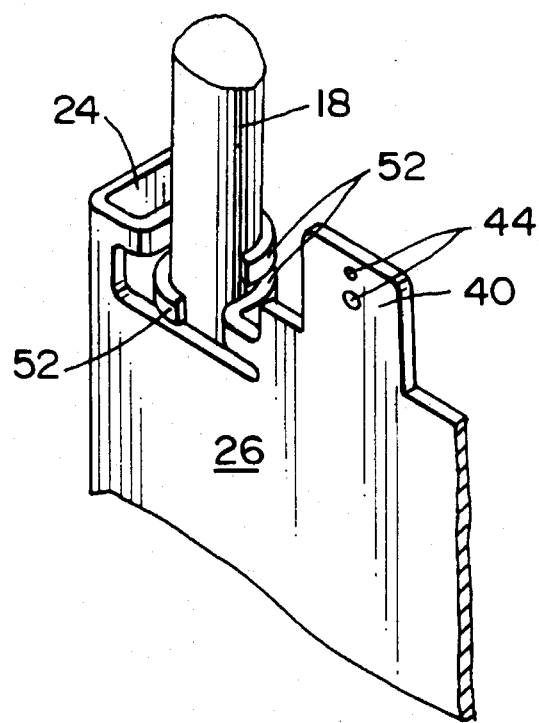
FIG. 6 is a fragmented perspective view of one of the pairs of cable ties wrapped about a cable.

More particularly, shield portion 24 is generally plate-like in configuration, has a width sufficient to protect an appropriate flat ribbon cable and includes wings 48 which extend beyond end walls 28 of bracket portion 22. Wings 48 are bent, as at 50, out of the plane of plate-like shield portion 24 toward bracket portion 22. This positions flat cable 16 more centrally of the open area between bracket portion 22 and shield portion 24, i.e. more centrally of whatever power distribution device 19 or electrical connector is mounted to or within the bracket portion. Equally as important is the fact that the wings space the cable from wall panel 14 so that any nails, screws or other foreign objects which are inserted through wall panel 14 simply will not even engage the wings and the cable there-behind FIGS. 5 and 6 show an alternate embodiment of the invention wherein two pairs of cable ties or fingers 52 are stamped out of wall portion 26 of the mounting apparatus, whereby the cable ties are integral with the stamped and formed sheet metal structure. These cable ties can be used, as shown in FIG. 6, for wrapping around an electrical cable before protective outer covering 18 is removed to expose flat cable 16. In essence, the cable ties provide a locating means to permit a long cable to be laid through an entire wall panel system before the terminating procedures are initiated. In other words, the cable ties act as an initial locating means for a long cable distribution system, and the cable can be "threaded" from one mounting apparatus to another or from a mounting apparatus to other service locations of the wall panel system before the cable is prepared for and terminated to various power distribution devices or connectors.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a mounting apparatus for mounting an electrical power distribution device to a wall support member inside a wall panel having at least one wall to protect an electrical cable running into and out of the apparatus in a plane parallel to said one wall and inside said wall panel, the cable having a longitudinal axis adjacent the apparatus defining a running direction of the cable, the apparatus including a bracket portion, having an outer perimeter defining an opening, for mounting the power distribution device so that the device may be accessed through the opening and means for securing the apparatus to the wall support member with the bracket portion projecting from the securing means generally parallel to said at least one wall, wherein the improvement comprises a shield portion of the apparatus extending from the securing means and in a plane parallel to the bracket portion, the bracket portion spaced from the shield portion to define an open area therebetween adapted to receive the power distribution device in a plane parallel to the bracket and shield portions and, said shield portion extending in the running direction of the cable beyond the outer perimeter of the bracket portion to protect a side of the cable facing away from said one wall beyond the power distribution device outside the perimeter of the bracket portion.

2. In a mounting apparatus as set forth in claim 1, wherein the apparatus comprises a unitary structure stamped and formed of sheet metal material.

3. In a mounting apparatus as set forth in claim 2, wherein said shield portion has a substantial width sufficient to protect an appropriate flat ribbon cable.

4. In a mounting apparatus as set forth in claim 3 wherein the portion of the shield portion extending in the running direction of the cable beyond the outer perimeter of the bracket portion consists of wings bent slightly toward the bracket portion to position the cable spaced from the wall panel.

5. In a mounting apparatus as set forth in claim 1, including cable tie means unitary with the apparatus for locating the electrical cable relative to the bracket portion and the shield portion thereof.

6. In a mounting apparatus as set forth in claim 5, wherein the apparatus comprises a unitary structure stamped and formed of sheet metal material, and said cable tie means are formed integrally therewith.

7. In a mounting apparatus as set forth in claim 6, wherein said bracket portion and shield portion are spaced relative to each other by an integral wall portion, and said cable tie means are formed integral with said wall portion.

* * * * *